United States Patent
Amthor et al.

(10) Patent No.: US 12,313,828 B2
(45) Date of Patent: May 27, 2025

(54) METHOD AND APPARATUS FOR ANALYSIS OF A SAMPLE BY LIGHT SHEET MICROSCOPY

(71) Applicant: Carl Zeiss Microscopy GmbH, Jena (DE)

(72) Inventors: Manuel Amthor, Jena (DE); Daniel Haase, Zöllnitz (DE); Thomas Kalkbrenner, Jena (DE); Jörg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 637 days.

(21) Appl. No.: 17/680,695

(22) Filed: Feb. 25, 2022

(65) Prior Publication Data
US 2022/0276478 A1    Sep. 1, 2022

(30) Foreign Application Priority Data
Mar. 1, 2021   (DE) ............... 10 2021 104 871.0

(51) Int. Cl.
*G02B 21/00*   (2006.01)
*G02B 21/24*   (2006.01)
(Continued)

(52) U.S. Cl.
CPC ....... *G02B 21/0032* (2013.01); *G02B 21/244* (2013.01); *G02B 21/361* (2013.01);
(Continued)

(58) Field of Classification Search
CPC .............. G02B 21/0032; G02B 21/244; G02B 21/361; G06T 7/0002; G06T 2207/10056; G06T 2207/20084
See application file for complete search history.

(56) References Cited

U.S. PATENT DOCUMENTS

| 2006/0033987 A1 | 2/2006 | Stelzer et al. |
| 2012/0206798 A1 | 8/2012 | Knop et al. |

(Continued)

FOREIGN PATENT DOCUMENTS

| CN | 111164485 A | 5/2020 |
| DE | 102 57 423 A1 | 6/2004 |

(Continued)

OTHER PUBLICATIONS

Kettunen, Ville, et al., "Propagation-invariant spot arrays," *Optics Letters*, vol. 23, No. 16, pp. 1247-1249 (Aug. 15, 1998).

*Primary Examiner* — Georgia Y Epps
*Assistant Examiner* — Don J Williams
(74) *Attorney, Agent, or Firm* — Christensen, Fonder, Dardi & Herbert PLLC; John P. Fonder

(57) ABSTRACT

A method for light sheet microscope examination of a specimen, the specimen being illuminated with a light sheet by an illumination objective, and a light sheet microscope for performing the method. Light emitted by the specimen is imaged onto an area-type detector by a detection objective. An optical axis of the detection objective encloses with an optical axis of the illumination objective an angle that differs from 0° and from 180° and intersects the light sheet in a light sheet plane. The area-type detector records an image. A neural network analyzes the image to determine whether the light sheet plane is located in a focal plane of the detection objective, and/or in which direction along the optical axis the light sheet plane is located from the focal plane, and/or at what distance, measured along the optical axis of the detection objective, the light sheet plane is from the focal plane.

20 Claims, 3 Drawing Sheets

(51) Int. Cl.
*G02B 21/36* (2006.01)
*G06T 7/00* (2017.01)

(52) U.S. Cl.
CPC .......... *G02B 21/367* (2013.01); *G06T 7/0002* (2013.01); *G06T 2207/10056* (2013.01); *G06T 2207/20084* (2013.01)

(56) References Cited

U.S. PATENT DOCUMENTS

| | | |
|---|---|---|
| 2013/0286181 A1 | 10/2013 | Betzig et al. |
| 2014/0126046 A1 | 5/2014 | Shroff et al. |
| 2015/0168732 A1 | 6/2015 | Singer et al. |
| 2019/0378260 A1* | 12/2019 | Brauer .................. G06T 7/001 |
| 2020/0200531 A1 | 6/2020 | Amthor et al. |
| 2022/0028116 A1 | 1/2022 | Sieckmann et al. |

FOREIGN PATENT DOCUMENTS

| | | |
|---|---|---|
| DE | 10 2014 102 080 A1 | 8/2015 |
| DE | 10 2018 133 188 A1 | 6/2020 |
| DE | 10 2018 219 867 B4 | 10/2020 |
| WO | WO 2004/053558 A1 | 6/2004 |
| WO | WO 2012/110488 A2 | 8/2012 |
| WO | WO 2012/122027 A2 | 9/2012 |
| WO | WO 2014/005682 A2 | 1/2014 |
| WO | WO 2020/104521 A2 | 5/2020 |

\* cited by examiner

| Pos. #1 | Pos. #2 | Pos. #3 | Pos. #4 | Pos. #5 | Pos. #6 | Pos. #7 | Pos. #8 | Pos. #9 | Pos. #10 | Pos. #11 |
|---|---|---|---|---|---|---|---|---|---|---|
| 0.0 | 0.1 | 0.2 | 0.3 | 0.7 | 0.9 | 0.8 | 0.5 | 0.2 | 0.1 | 0.0 |

METHOD AND APPARATUS FOR ANALYSIS OF A SAMPLE BY LIGHT SHEET MICROSCOPY

PRIORITY CLAIM

The present application claims priority to German Patent Application No. 10 2021 104 871.0, filed on Mar. 1, 2021, which said application is incorporated by reference in its entirety herein.

FIELD OF THE INVENTION

The invention relates to a method for light sheet microscopic examination of a specimen. The specimen is here illuminated with a light sheet by means of an illumination objective. Light emitted by the specimen is imaged onto an area-type detector by means of a detection objective. An optical axis of the detection objective here encloses with an optical axis of the illumination objective an angle that differs from 0° and from 180°. The optical axis intersects the light sheet in a light sheet plane. The area-type detector then records at least one image.

The illumination objective also has an optical axis, which is situated in the light sheet plane. The optical axis of the detection objective is here preferably perpendicular to the light sheet plane, although this is not mandatory. In general, the optical axis of the detection objective encloses with the light sheet plane an angle that differs from 0° and correspondingly from 180°; the thicker the light sheet is in its waist, the larger the angle should be.

BACKGROUND OF THE INVENTION

The examination of biological specimens, in which the specimen is illuminated with a light sheet, the plane of which—the light sheet of plane—intersects the optical axis of the detection—the detection direction—in a non-zero angle, has become increasingly important in recent times. The light sheet plane typically encloses with the detection direction, which generally corresponds to the optical axis of the detection objective, a non-zero angle, which is frequently—but not necessarily—a right angle. Such examination methods are primarily used in fluorescence microscopy and are combined under the term LSFM (light sheet fluorescence microscopy). One example is the method designated as SPIM (selective plane illumination microscopy), which is described in DE 102 57 423 A1 and, building thereon, in WO 2004/0535558 A1 and with which spatial recordings even of relatively thick specimens can be created within a relatively short period of time: A visual/spatially extended representation of the specimen is possible on the basis of optical sections combined with a relative movement in a direction perpendicular to the section plane.

The LSFM methods have a number of advantages over other established methods such as confocal laser scanning microscopy or two-photon microscopy. Since the detection can be undertaken in the wide field, it is possible to capture relatively large specimen regions. Even though the resolution is slightly lower than in confocal laser scanning microscopy, it is possible to analyze thicker specimens using the LSFM technique because the penetration depth is greater. Moreover, this method involves the lowest light exposure of the specimen, reducing the risk of bleaching of a specimen since the specimen is illuminated only by a thin light sheet at a non-zero angle with respect to the detection direction.

Rather than a purely static light sheet, it is also possible to generate a quasi-static light sheet by quickly sampling the specimen with a light beam. The light sheet-type illumination arises when the light beam undergoes a very fast relative movement with respect to the specimen to be observed and is arranged in a series multiple times in temporal succession. The integration time of the camera onto whose sensor the specimen is imaged is selected such that sampling is concluded within the integration time.

One of the main applications of light sheet microscopy is found in imaging of medium-sized organisms of a few 100 µm up to a few mm. Generally, these organisms are embedded in a gel, for example in agarose, which in turn is located in a glass capillary. The glass capillary is introduced into a water-filled specimen chamber from above or from below and the specimen is forced out of the capillary a little way. The specimen in agarose is illuminated with a light sheet and the fluorescence is imaged onto a camera using a detection objective, which is—preferably but not necessarily—perpendicular to the light sheet and thus also perpendicular to the illumination objective of an optical system for generating a light sheet.

This method of light sheet microscopy, however, is subject to certain restrictions. First, the specimens to be examined are relatively large; they originate from developmental biology. Second, on account of the specimen preparation and the dimensions of the specimen chamber, the light sheet is relatively thick and the axial resolution that can be achieved is thus limited. Third, the preparation of the specimens is complex and incompatible with standard specimen preparations and standard specimen mounts as is customary in fluorescence microscopy for individual cells.

In order to partly circumvent these restrictions, a novel construction was implemented in recent years, in which the illumination objective and the detection objective are preferably perpendicular to one another and directed onto the specimen from above at an angle of 45°. Such procedures are described, for example, in WO 2012/110488 A1 and WO 2012/122027 A1.

Generally, coherent light of a laser is used to illuminate the specimen. The wavelength of the light in fluorescence microscopy is selected in dependence on markers that are intended to be excited to emit fluorescence. In the simplest case, for example a light beam having an intensity profile that corresponds to a Gaussian function can be shaped to form a light sheet statically by means of cylindrical lenses or quasi-statically by means of sampling and an integration time of the camera that is matched thereto. The advantage here is structured illumination of the specimen, as a result of which the resolution can be increased. For example, the coherent superposition of Bessel beams is described in an article by V. Kettunen et al., *"Propagation-invariant spot arrays"*, published in Optics Letters 23(16), page 1247, 1998. The superposition is achieved by calculating with the aid of an algorithm a phase element which can be introduced into the pupil. If the spectrum of a Bessel beam is imaged into the pupil, the phase element generates a multiplicity of Bessel beams which are superposed in the specimen. The phase element is similar to a star-shaped grating having the phase values 0 and π.

In US 2013/0286181 A1, the interference effects between the individual Bessel beams are used in a targeted manner in order to generate an extended and structured light sheet. In this case, the Bessel beams are arranged next to one another so closely that the secondary maxima of the individual Bessel beams above and below the propagation plane, the light sheet plane, are destructively superposed. Depending on the spacing between the individual Bessel beams, different interference patterns are formed.

WO 2014/005682 A1 describes the generation of what are known as $sinc^3$ beams. It is thereby possible to generate in the specimen a nearly cuboid light sheet with only small secondary maxima.

SUMMARY OF THE INVENTION

Irrespective of the type of light sheet, it is a challenge in this type of microscopy to position the light sheet with its light sheet plane and the detection objective relative to one another in a manner such that the light sheet plane in a specified region of the object field of the detection objective is brought into correspondence with the focal plane of that objective. Frequently, the optical axis of the detection objective is perpendicular to the light sheet plane, and in that case the light sheet plane and the focal plane of the detection objective must be brought into correspondence, i.e. must be brought congruently into the same plane. This can be accomplished by a relative movement of the two objectives with respect to each other. By shifting the detection objective along its optical axis, its focal plane can be shifted. Also typical however is positioning of the light sheet with the aid of an illumination device, of which the illumination objective forms one part. The light sheet can in this case be shifted both along the optical axis of the detection objective and also along the optical axis of the illumination objective.

The state of optimum focusing is generally determined visually. A user typically discerns on the basis of the instantaneous image of the specimen when the state of optimum focusing is achieved. The visual impression for this type of illumination in one plane is very much dependent on the—generally unknown—specimen and its spatial structure. This procedure therefore requires a great deal of experience and is not always reproducible. For example, a region that is currently located in the focal plane of the detection objective may have only few fluorescent structures, while an adjacent region in the same plane or above/below has many fluorescent structures. An inexperienced user might now attempt to reposition the light sheet to where the many fluorescent structures are located, either by way of laterally displacing the waist of the light sheet or by shifting it along the optical axis of the detection objective. In either case, the result is an increase in the detected signal and incorrectly suggests a better state of focusing. With the aid of conventional criteria for assessing image quality, such as for example determination of the sharpness and/or the contrast, which are frequently used for example for autofocusing photographic objective lenses, the susceptibility to errors when assessing the focusing can be reduced somewhat, but not to such an extent that the state of optimum focusing can be reproducibly set for an unknown specimen.

It is therefore an object of the invention to develop a method of the type described in the introductory part for light sheet microscopic examination of a specimen in a manner such that the state of optimum focusing can be determined reproducibly and thus objectively independently of the specimen and also independently of a user; optionally, the best possible focusing should be set automatically. In addition, a light sheet microscope capable of carrying out this method should be provided.

This object is achieved in the method described in the introductory part in the simplest case by determining, by means of a neural network, through analysis of the at least one image, whether or not the light sheet plane is located at least partially in a focal plane of the detection objective. If the light sheet plane and the optical axis of the detection objective are perpendicular to one another, the light sheet plane lies in the focal plane in the state of best possible focusing. However, configurations are also used in which the light sheet plane and the optical axis of the detection objective enclose an angle that differs from 90° with the result that the light sheet plane and the focal plane of the detection objective intersect along a straight line and the light sheet plane is then located only partially in the focal plane of the detection objective. In principle, all angles between 0° and 180° are possible, with these two limit angles being excluded. However, the advantages of the light sheet illumination are not able to be realized even in the vicinity of these two limit angles because the light sheet has a finite thickness, and therefore the illumination would then no longer be limited to a small region around the focal plane of the detection objective. In addition to the binary determination of the location of the light sheet plane with respect to the focal plane of the detection objective, it is, alternatively or in combination, also possible to determine in which direction along the optical axis of the detection objective the light sheet plane lies from the focal plane and/or at what distance, measured along the optical axis of the detection objective, the light sheet plane lies from the focal plane.

The at least one image is transferred to the neural network. The latter then analyzes the image on the basis of stipulated criteria with respect to the location of the light sheet plane with respect to the focal plane of the detection objective. These criteria are taught to the neural network on the basis of exemplary data, preferably already by the manufacturer. These are criteria that are improved over the course of time with a multiplicity of performed examinations; the neural network can learn more with each light sheet microscopic examination and modify the criteria and/or the weighting thereof.

It is possible in particular even before the at least one image is recorded to determine a type of the specimen and to adapt the light sheet to said specimen via light sheet parameters. This determination is preferably done automatically. The type of the specimen is dependent for example on its transparency or its marking with fluorescence markers. The light sheet parameters—among them colour and structure of the light sheet—are then set for example such that they provide the best contrast for the detected specimen type during the recording. The light sheet parameters and the type of the specimen can be made available to the neural network as examination parameters in order to accelerate the analysis and increase the accuracy thereof.

The neural network used is preferably a deep neural network (DNN), with particular preference a convolutional neural network (CNN). This type of neural networks is particularly suitable for the processing and analysis of image files. In particular CNNs are particularly suitable for the use with illumination of the specimen by way of a structured light sheet, for example with a stripe pattern: The convolution can here be limited to one dimension, as a result of which the dependence on the specimen structure is reduced because in that case only image regions that have the same phase of the light sheet structuring are computationally combined. It is advantageous in this case to limit the receptive field of the CNN to a period of the light sheet in order to further reduce the dependence on the specimen. Both measures can be applied alternatively or in combination.

If a single image is recorded, the neural network makes at least one statement as to whether or not the light sheet plane is—at least partially—in the focal plane of the detection objective. The better the neural network has been trained, the better and more accurate statements can be made. In particular, it is then possible to ascertain on the basis of an individual image not only whether or not the light sheet plane is at least partially located in the focal plane of the detection objective, but also—provided the light sheet plane is not located in the focal plane—in which direction along the optical axis of the detection objective the focal plane is located and also at what distance the focal plane of the detection objective is located from the light sheet plane. The distance is determined preferably on the basis of the determination of the focus quality for the at least one image.

In one preferred refinement of the method, however, a sequence of images is recorded, transferred to the neural network and analyzed by the latter. The sequence of images can here be generated in different ways. In a first refinement, the sequence of images can be recorded at a constant location of the focus of the detection objective and different positions of the light sheet along the optical axis of the illumination objective. This procedure makes it possible to determine the location of the waist of the light sheet with respect to the optical axis of the detection objective and possibly position it such that the optical axis of the detection objective intersects the waist of the light sheet. Viewed from a direction perpendicular to the light sheet plane, the light sheet is at its thinnest at this point, which means that the illuminated specimen region along the optical axis of the detection objective likewise has the smallest extent, which is advantageous for light sheet microscopic examination. Before the images of the sequence are transferred to the neural network, they are advantageously combined to form an overall image, and the overall image is then transferred to the neural network.

However, in a second refinement, the sequence of images can also be recorded at different positions of the light sheet or of the light sheet plane relative to the focal plane of the detection objective along the optical axis of the detection objective, i.e. around the focal plane. For this purpose, either the position of the light sheet or the location of the focal plane of the detection objective can be varied. These positions can be arranged at an equidistant or variable distance from one another. A sequence of images which is recorded along the optical axis of the detection objective—also referred to as the Z-axis—at equidistantly distanced positions of the light sheet is also referred to as Z-stack. In the simplest case, this Z-stack is transferred without further processing to the neural network for analysis, wherein generally each individual image of the sequence is transferred to the network via its own channel. One advantage over the analysis of a single individual image is that important information from planes adjacent to the focal plane can be used. The neural network can thus, for example, assess the structure sharpness between the planes and determine therefrom, with less outlay than in the case of the individual image analysis, in which direction and possibly how far the light sheet needs to be shifted along the optical axis of the detection objective for it to lie in the focal plane of the latter. The processing by way of the neural network can here take place on the complete Z-stack, and the number of input channels for the neural network then corresponds to the number of the recordings in the Z-stack. However, processing can also be limited to part of the Z-stack, in accordance with a three-dimensional convolution.

However, the use of a Z-stack prescribes relatively rigid boundary conditions for the neural network, such as an equidistant distance along the optical axis of the detection objective and the number of images. If a network is trained for such a stack, the conditions for said network can no longer be changed, that is to say for differently parameterized Z-stacks, differently trained networks must also be available. The use of a Z-stack, however, offers the advantage that common information of all planes is available. In a particularly preferred refinement, more flexible management of the number of images and of their distances from one another or their locations along the optical axis of the detection objective is permitted but, before the transfer to the neural network, the sequence of images is alternatively combined to form an overall image rather than a Z-stack. This is accomplished by arranging the individual images from various focal locations in series and combining them to form a two-dimensional overall image along an axis or direction in an image coordinate system. In a Cartesian image coordinate system, preferably the axis along which the number of the pixels in the image is lower is selected therefor; however, this makes no difference to the neural network. Only the overall image is then transferred via a single channel to the neural network. In particular a fully convolutional neural network (FCN) is suitable for analyzing such an overall image. An FCN can be trained with a variable number of recordings and can then also be applied to a variable number of recordings. The distance between the recordings along the Z-axis here does not need to be stipulated beforehand and can also vary. During the analysis of the overall image, advantageously the information from adjacent planes—thus adjacent images in this case—are likewise taken into account.

In the simplest case, in particular when training the network using individual images, the network outputs that the light sheet plane is or is not located at least partially in the focal plane of the detection objective. In particular if the network has already been trained and/or a sequence of images has been recorded, the network can also analyze in which direction and/or at what distance the light sheet plane is located from the focal plane. The distance is here measured along the optical axis of the detection objective, which is important in particular if the light sheet plane encloses with the focal plane of the detection objective an angle that differs from 90°. In a neural network that has been sufficiently trained, an individual image may under certain circumstances already be sufficient; the direction and/or distance especially in unknown systems can be determined more accurately on the basis of a Z-stack or an overall image.

In addition to a classification into the categories "in focus" and "not in focus" and the subcategories "above the focal plane" and "below the focal plane" in the category "not in focus", it is also possible in an especially advantageous refinement, by way of the neural network, to also determine the specific distance from the focal plane, which can then be output either to indicate to a user how the light sheet should be adjusted or to position the light sheet correctly in the focal plane in the region of the optical axis of the detection objective using a controller, using a relative movement of the light sheet plane and the focal plane of the detection objective with respect to one another. Once the light sheet is correctly positioned, the actual examination of the specimen begins by once again either recording individual images or image stacks, wherein in this case the specimen stage is generally displaced because the detection objective is focused onto the light sheet.

In order to determine the distance of the light sheet plane from the focal plane of the detection objective, the focus quality is expediently determined for the at least one image. Said focus quality can additionally be normalized to a scale between 0 and 1, and a so-called score which corresponds to the focus quality is then assigned to the image. A score of 1 here means that the light sheet plane lies in the focal plane, and decreasing scores correspond to an increase in distance between the focal plane of the detection objective and the light sheet plane. In particular when recording a sequence of images, said images can be combined to an overall image before the analysis preferably by way of an FCN. The neural network then determines a focus quality for each of the images in the overall image and, from the focus quality, a score that is stored for the overall image, generally in the form of a score vector, and contains a number of elements corresponding to the number of the images in the overall image. It is here also possible for the focus quality of the remaining images to be incorporated in the calculation of the respective score. As the result, the vector with the scores is output, and, from the scores, a position for the light sheet plane at which the latter corresponds to the focal plane of the detection objective in a region of the object field of the detection objective—for example the centre of the object field—can then be determined. This value can then be used for the corresponding—automatic or manual—setting of the light sheet plane. It is here possible for the highest score to then be used as the result for the setting of the light sheet plane, although a more accurate value can be determined preferably by means of interpolation, for example by means of polynomial regression. The light sheet plane is then preferably automatically shifted into the correspondingly determined focal location of the detection objective.

An iterative search for a position is also possible. In the case of binary classification, the positioning of the light sheet in relation to the focal plane of the detection objective can for example take place iteratively by shifting the light sheet plane along the optical axis of the detection objective after the classification of the result into the category "not in focus" and recording a further image and analyzing it using the neural network. No later than after the recording of a second image is it possible, by comparison, to also indicate the direction in which the focal plane of the detection objective lies with respect to the light sheet plane. In this way, the light sheet plane can be iteratively successively brought into correspondence with the focal plane.

A further possibility for an iterative search in the case of the binary classification is to initially record a first sequence of images at different positions of the light sheet in relation to the focal plane of the detection objective along the optical axis of the detection objective, that is to say individual images with large, possibly fixed spacings along the optical axis of the detection objective, and to determine the focus quality, for example by using the calculated confidence, for each of the images using the neural network. The neural network then determines the two images from the first sequence between which along the optical axis of the detection objective the focus quality is best. In the case of equidistant recordings, these are generally the two images having the highest focus quality. The positions of the light sheet on the optical axis of the detection objective at which these two images were recorded define the distance interval with the best focus quality. Between the positions along the optical axis assigned to these two images of the first sequence, that is to say in the distance interval having the best focus quality, a further sequence of images is then recorded at different positions of the light sheet in relation to the focal plane of the detection objective along the optical axis of the detection objective, that is to say individual images are again recorded, but only within the interval having the best focus quality. In other words, the measurement distances are decreased and the search is refined. These steps are repeated until the focus position has been found. An interruption criterion for the iteration that can be defined for example is that the distance between the two images between which the focus quality is best falls under a specified value. Alternatively or in combination, another interruption criterion can also be that the focus quality of these two images exceeds a specified value. In that case, either one of these positions can be equated with the focal plane of the detection objective within the scope of the specified tolerances defined by the interruption criteria or it is determined by interpolation from the values of the focus quality for the different positions.

The recording of a Z-stack may also be handled similarly, with said Z-stack in this case corresponding to the respective sequence of images. Here, Z-stacks can be recorded with different finely resolved distances of the individual images of the stack along the optical axis of the detection objective. The advantage of this type of approach is that there is no need to search the entire search region with a high resolution with respect to the distances.

Another possibility for positioning the light sheet, which achieves its target faster than the approach based on binary classification, albeit possibly with a slightly reduced accuracy, is to determine the distance, that is to say the separation between the light sheet plane in its current position in the respective image and the focal plane of the detection objective, for the at least one image by regression. Here, for example, it is possible by way of the neural network to determine either by means of regression a distance from a continuous quantity of numbers or by means of ordinal regression a distance from a discrete quantity of numbers. To this end, it is likewise possible to record a Z-stack, although it is also possible for individual images to be recorded at different distances of the light sheet plane from the focal plane of the detection objective. Each of the images is assessed by the neural network with respect to specific criteria. The neural network determines for the at least one image for example a distance value that indicates how far the position of the light sheet in which the image was recorded is from the focal plane of the detection objective; if a sampling rate with fixed distances along the optical axis of the detection objective is specified, the neural network can, for example, also determine a step value that indicates how many sampling steps are necessary under these conditions up to the focused location. Next, the individual results are combined into a final decision, for example by averaging: For example, if the distance or the number of steps up to the focal location of the detection objective is estimated at different positions of the light sheet along the optical axis of the detection objective, they can be normalized with respect to one another due to the fact that the number of the steps or distance changes with respect to one another is known. The predictions which have been normalized with respect to one another can subsequently be averaged to perform a final estimation; said final estimation or decision gives rise to a prediction for the distance of the light sheet plane from the focal plane of the detection objective. Together with the value for the distance, it is additionally possible to output a confidence that indicates how reliable the determination of the distance is.

In all cases, after the analysis using a neural network and the determination of that position at which the light sheet plane is located at least partially in the focal plane of the detection objective, the light sheet in a preferred refinement is automatically positioned such that the light sheet plane is brought into correspondence with the focal plane of the detection objective in a region of the object field of the detection objective. Preferably, care is taken here that there are no collisions between the objectives and the specimen stage or the specimen. If the optical axis of the detection objective and the light sheet plane enclose an angle of 90°, the correspondence exists in the entire object field. If the optical axis of the detection objective is inclined with respect to the light sheet plane, that is to say if the light sheet is tilted, this is not the case, and as a result the correspondence can be achieved only in a region of the object field. This region preferably lies in the centre of the object field, provided the at least one image was not divided into partial regions. It is of course also possible to merely output the distance and to make a user aware of how the light sheet needs to be adjusted.

A more flexible type of focusing is achieved in particular for such an inclined orientation if the at least one image is divided into partial regions and a determination is made by means of the neural network separately for each partial region in which direction and/or at what distance, measured parallel to the optical axis of the detection objective, the light sheet plane is located from the focal plane of the detection objective. If a partial region is selected and, for said partial region, the distance between the light sheet plane and the focal plane of the detection objective is determined, the light sheet plane is brought into correspondence with the focal plane of the detection objective in a corresponding region of an object field of the detection objective only for said partial region. This makes a flexible setting of the inclined light sheet possible, without any need to move, for example, the specimen stage to bring the partial region into the centre of the object field.

In order to increase the robustness of the method, a type of the specimen can be determined before the at least one image is recorded. This provides context information that can be transferred as parameters to the neural network. In particular parameters for the light sheet can be stipulated and a neural network can be selected depending on the type of the specimen—this is also understood to mean the type of the experiment that is to be performed. For example, the dye with which the specimen has been marked is also included in the type of the specimen. Accordingly, it is possible to select a laser with a wavelength that excites the dye to fluorescence. The neural network can also be selected in dependence on the type of the specimen. Expediently, versions of the same neural network model, i.e. having the same architecture, from which a selection is made and which have been trained in dependence on different specimen and/or light sheet types and are thus differently parameterized are available in this case. The selection between different network architectures is of course also possible. The more differentiated the parameterizations with respect to specimen and light sheet type are in the end, the more robust and less complex the network is.

In order to simplify the determination of the distance of the light sheet plane from the focal plane of the detection objective, and to make it more efficient, the at least one image is pre-analyzed, preferably before a determination of whether the light sheet is located at least partially in the focal plane of the detection objective, to ascertain whether the specimen is located in the image and, if this is the case, whether the specimen is at all suitable for the stated determination. This pre-analysis can be done in automated fashion on the basis of the entire image; for example, the image can be examined, by means of conventional methods but also by means of the neural network or a neural network that is tailored to the pre-analysis, with respect to regions of interest (ROI) that permit the above-stated determination. To this end, the at least one image is preferably divided into partial regions that are individually pre-analyzed. The partial regions can then be classified as suitable and unsuitable regions. A partial region has at least the size of a pixel of the area-type detector. The pre-analysis, that is to say the selection of the ROIs, can of course also be effected manually. In particular when initially training the neural network, such a manual selection will be the preferred option in order to minimize the error rate and to establish automated models for finding such ROIs. Automated detection of ROIs is also possible by means of usual detection and image evaluation, possibly also by using a neural network: An image is recorded and examined for areas in which ROIs are located or no ROIs are located. The output then takes place in a list with plane coordinates and possibly details relating to the size of the regions in the coordinates. This list with the coordinates of the ROIs or such areas that are unsuitable for the determination of the position of the light sheet plane in relation to the focal plane of the detection objective can then in turn be transferred to the neural network so that the subsequent analyses are limited to the ROIs, or specific unsuitable areas are not included in the analysis.

Expediently, the at least one image is prepared before the analysis or before a pre-analysis by means of image processing algorithms known from the prior art. These include for example algorithms for enhancing contrast, for filtering, for projection or for normalization.

The method can be integrated without major outlay into existing light sheet microscopes that have motorized control for moving the objectives and the specimen stage and for setting the position of the light sheet. Such a light sheet microscope for performing the above-described method comprises an illumination device for generating a light sheet with an illumination objective for illuminating a specimen with the light sheet. The light sheet microscope additionally comprises a detection device with a detection objective for imaging light emitted by the specimen onto an area-type detector. An optical axis of the detection objective and an optical axis of the illumination objective here enclose an angle that differs from 0° and from 180°. The angle is preferably 90°. The optical axis of the detection objective intersects the light sheet in a light sheet plane. Finally, the light sheet microscope has an image evaluation unit, which is connected to the area-type detector, for evaluating at least one image that is registered by the area-type detector. Here, a neural network that determines during the evaluation whether or not the light sheet is located at least partially in a focal plane of the detection objective is implemented in the image evaluation unit. For automatic adjustment of the location of the light sheet and/or of the focal plane of the detection objective in dependence on the evaluation by way of the neural network, the light sheet microscope preferably comprises a controller, with the result that the light sheet plane is brought into correspondence with the focal plane of the detection objective in a region of an object field of the detection objective—or, if the light sheet is inclined, in a previously specified partial region of the object field.

It is understood that the features mentioned above and the features still to be explained below can be used not only in the specified combinations but also in other combinations or on their own without departing from the scope of the present invention.

BRIEF DESCRIPTION OF THE DRAWINGS

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained multiple times. In the figures.

DETAILED DESCRIPTION

Figure 1:
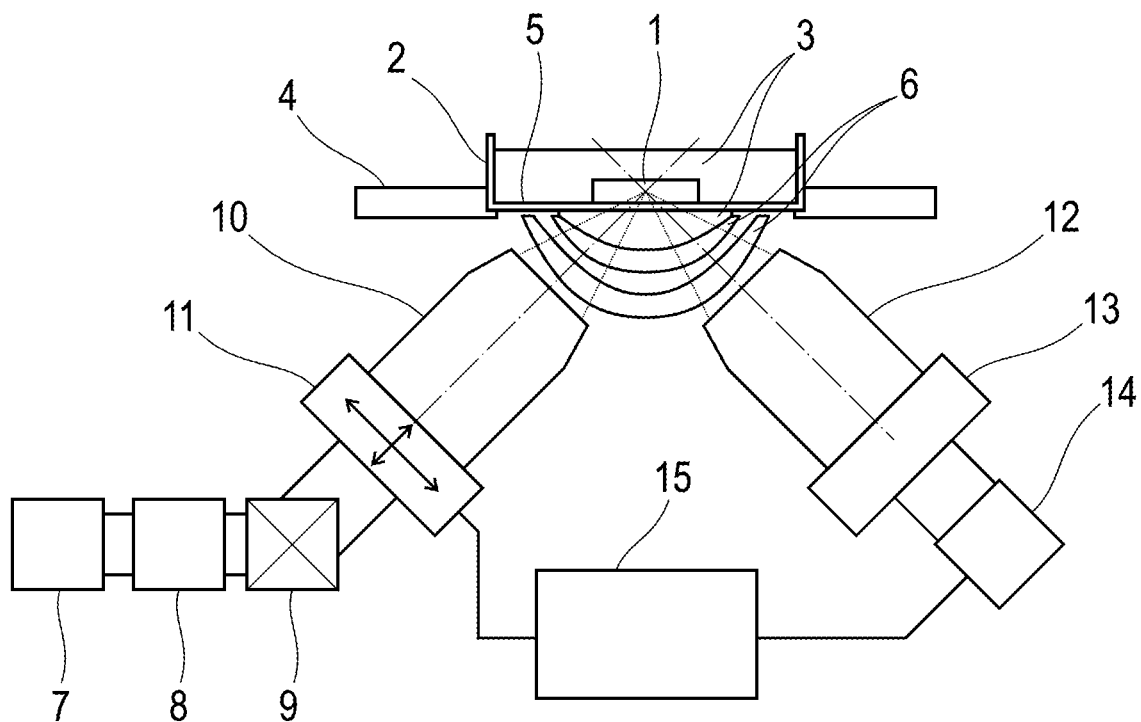
FIG. 1 shows a light sheet microscope.

FIG. 1 initially shows the fundamental construction of a light sheet microscope that can be used for light sheet microscopic examination of a specimen. The light sheet microscope is shown here in an inverted configuration, which is to be understood only to be an example, and even light sheet microscopes in which the specimen is viewed from above or from the side are possible refinements. A specimen 1 is located in a specimen chamber 2 and is surrounded by a liquid 3, for example water or a nutrient solution The specimen chamber 2 has side walls and a bottom made of glass of a specified thickness, wherein the thickness generally corresponds to that of a typical object slide, for example 0.17 mm. The specimen chamber 2 is mounted on a specimen stage 4, and the specimen stage is movable manually or by way of a motor in all three spatial directions. The individual elements of the light sheet microscope are arranged below the specimen chamber 2, which has a transparent bottom 5. What is known as a virtual relay 6 with an inner and an outer lens is located between the objectives of the light sheet microscope and the bottom 5 of the specimen chamber 2. The liquid 3 is likewise located between the inner lens of the virtual relay 6 and the bottom 5 of the specimen chamber. The surrounding atmosphere, generally air, is located between the inner and the outer lens of the virtual relay 6 and also between the outer lens of the virtual relay 6 and the objectives of the light sheet microscope.

The virtual relay 6 serves to compensate for aberrations that arise because the optical axes of the illumination objective and the detection objective are not perpendicular to the bottom 5 of the specimen chamber 2. Instead of a virtual relay 6, other correction mechanisms can also be used, such as auxiliary lenses or free-form lenses, which are integrated into the objectives, if such a correction is necessary. In particular, it is possible to use, rather than the virtual relay, a concentric lens for the adaptation to the refractive index of the specimen, and to correct the aberrations through the oblique coverslip passage by means of free-form surfaces within the objective or through adaptive optical elements outside the objective. For observation from above, a different configuration is required; generally, immersion objectives are then used, which dip directly into the liquid 3.

On the left-hand side, an illumination device with the illumination beam path is shown. Light from a laser module 7—for example, a plurality of lasers with different wavelengths could be accommodated here and a selection could be made between different wavelengths, wherein a plurality of wavelengths could also be selected at the same time—is steered via a beam-shaping module 8 and a scanning module 9—which is used, for example, to generate a quasi-static light sheet and/or for angular sampling—onto an illumination objective 10, which images the light sheet into the light sheet plane, which includes the optical axis of the illumination objective in this case, into the specimen. The specimen is thus illuminated with the light sheet via the illumination objective 10. The focus of the illumination objective 10, i.e. the point at which the light sheet has the thinnest extent—also referred to as the waist—can be adjusted with the aid of a positioning unit 11 in the directions indicated by the double-headed arrow. A piezo drive, for example, can be used for the adjustment in the light sheet plane along the optical axis of the illumination objective 10; this movement is denoted by the short double-headed arrow. Perpendicular to the light sheet plane—denoted by the long double-headed arrow—positioning can be effected for example by means of a tiltable mirror or a galvanometric scanner, which is arranged in a pupil plane of the illumination objective 10.

Shown on the right-hand side is a detection device having an exemplary detection beam path. The detection device comprises a detection objective 12, which can be adjusted, similarly to the illumination objective 10, by means of a drive, in this case only one piezo drive 13. The optical axis of the detection objective 12 includes with the light sheet plane in which the optical axis of the illumination objective 10 lies an angle that differs from 0° and from 180°, a right angle in this case. However, this is not absolutely necessary; the method can also be carried out at a non-zero angle between the plane of the light sheet and the optical axis of the detection objective 12. The optical axis of the detection objective 12 intersects the light sheet in the light sheet plane. Fluorescence light emitted by the specimen 1 is steered by the detection objective 12 onto a detection module 14. An area-type detector, which registers the intensity and converts it into a corresponding electrical signal that is then included in image processing, is located in the detection module 14. At least the detection module 14 and the positioning unit 11 are connected to a control unit 15. The other elements can, if they are controllable, also be connected to the control unit 15, but the corresponding connections are not illustrated here for the sake of clarity.

Integrated into the control unit 15 is an image evaluation unit, which is connected to the area-type detector via the control unit 15. Said image evaluation unit serves for the evaluation of images that are registered by the area-type detector. Again, a neural network that determines during the evaluation whether or not the light sheet is located at least partially in a focal plane of the detection objective 12 is implemented in the image evaluation unit. Integrated into the control unit 15 is additionally a controller for automatically adjusting the location of the light sheet and/or the focal plane of the detection objective. Depending on the evaluation using the neural network, the controller adjusts the location of the light sheet and/or the focal plane of the detection objective, with the result that the light sheet plane is brought into correspondence with the focal plane of the detection objective in a region of the object field of the detection objective.

Figure 2:
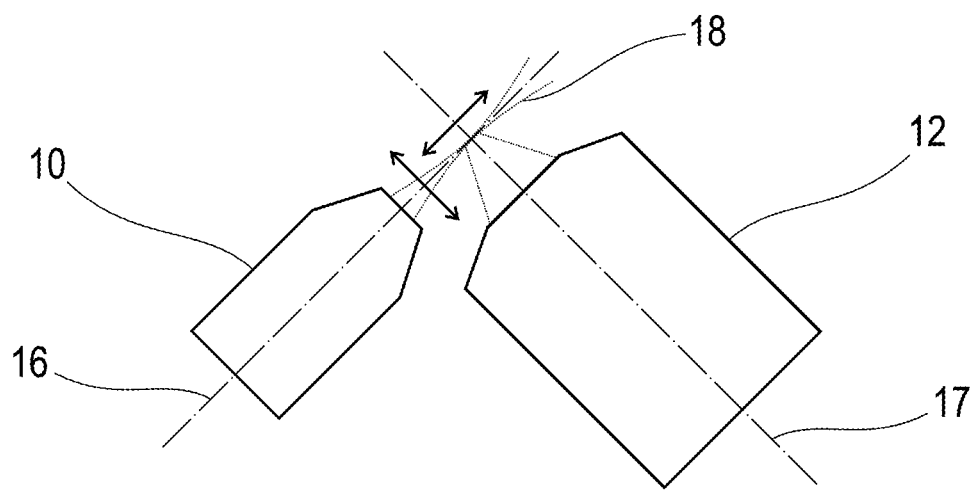
FIG. 2 shows a detail from the light sheet microscope.

FIG. 2 shows the situation of illumination and detection in detail, with the specimen 1 not being illustrated for the sake of clarity. An optical axis 16 of the illumination objective 10 and an optical axis 17 of the detection objective 12 are arranged at right angles. The illumination objective 16 emits a light sheet 18; the light sheet plane is here disposed perpendicular to the paper plane and includes the optical axis 16 of the illumination objective 10. For reasons related to illumination, the light sheet 18 is not entirely planar, but varies in terms of its thickness along the optical axis 17 of the detection objective 12. In the ideal state that is shown here, the thinnest point of the light sheet 18, its waist, lies exactly in the focal plane of the detection objective 12. It is at this point that the optical axis 17 of the detection objective 12 intersects the light sheet plane. The double-headed arrows again indicate the options for positioning the light sheet 18 relative to the detection objective 12.

Figure 3:
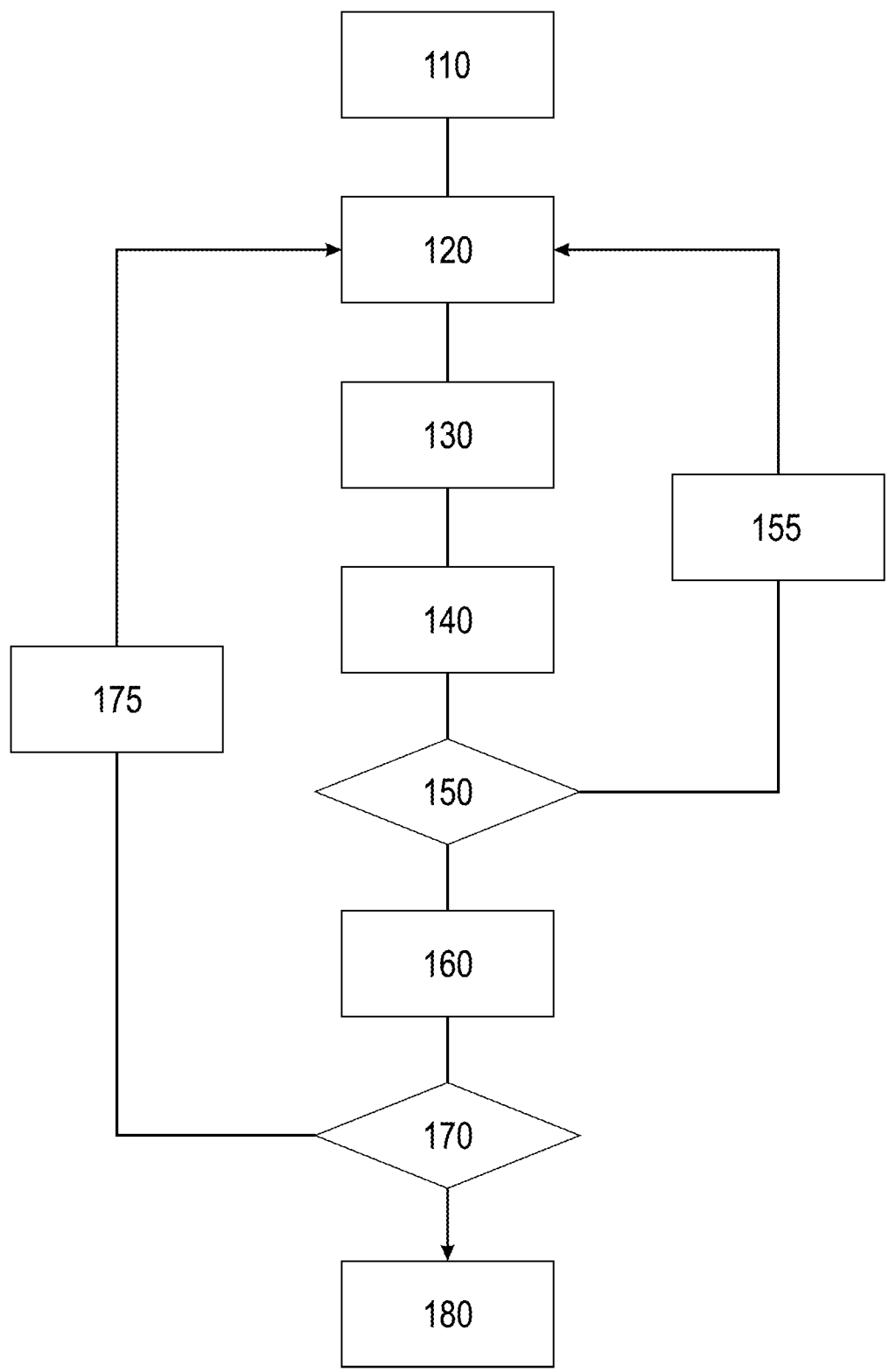
FIG. 3 shows a typical method sequence for determining the distance of the light sheet plane from the focal plane of the detection objective.

FIG. 3 shows a typical method sequence during the determination of the location of the light sheet plane relative to the focal plane of the detection objective 12 within the scope of the light sheet microscopic examination of the specimen 1. In a first, preparing step 110, the specimen 1 is situated, that is to say placed on the specimen stage. Optionally, context information can already be taken into account here for preparing the recording. For example, the light sheet microscope can already detect what type of specimen has been situated, and parameters for the light sheet can be set accordingly so that for example the contrast is optimized. The specimen type can of course also be input by hand and the light sheet parameters can of course also be set manually. Typical light sheet parameters initially comprise the type of the light sheet—for example whether or not the light sheet is structured and the colour(s) of the light sheet selected in dependence on the marker or the markers. Further parameters are, among other things, the length and the thickness of the light sheet, which are likewise selected in dependence on the specimen. Thus, for example, very thin and short light sheets are preferred for yeast cells having an extent of between 2 μm and 5 μm, whereas correspondingly longer and thicker light sheets are used in multicellular organisms and organoids.

Next, in a step 120, at least one image of the specimen 1 is recorded with an area-type detector. For this purpose, the specimen 1 is illuminated with the light sheet 18 by means of the illumination objective 10. The light emitted by the specimen 1 is imaged onto the area-type detector by means of the detection objective 12. In the process, an individual image can be recorded, but it is also possible—in each case with a constant location of the focus—to record a sequence of images, either at different positions of the light sheet 18 along the optical axis 16 of the illumination objective 10 or at different positions along the optical axis 17 of the detection objective 12.

The image or the sequence of images is prepared in a step 130. This takes place by means of image processing algorithms, as are known in the prior art. For example, algorithms for enhancing contrast, for normalization, for filtering and for projection can be applied to the at least one image. In addition, the images or the data thereof are brought into a form that is suitable for the subsequent analysis, which will be described further below; this applies in particular to a recorded sequence of images. These can be combined, for example, to form a two-dimensional overall image or a spatial image stack, what is known as a Z-stack, and the latter only if the sequence of images was recorded at different positions along the optical axis 17 of the detection objective 12.

In a step 140, the at least one image is pre-analyzed as to whether the specimen 1 is located in the image and is suitable for the subsequent analysis. Based on this assessment, a decision is made in a step 150 as to whether the analysis can be started. If this is not the case, step 120 is performed again, but before this happens, a new region of the specimen 1 is selected in a step 155. This can be done automatically or by way of a user for example on the basis of an overview recording generated by using a separate objective.

Steps 130 and 140 can also be swapped around, and the interrogation 150 would in this case take place between steps 130 and 140. However, a prior preparation frequently helps to illustrate even weak structures in a manner such that they are suitable for the analysis described below. In addition, the pre-analysis in step 140 can also take place using the neural network or using a further neural network, and in this case it would make sense to perform step 130 beforehand.

Once the preparation and pre-analysis have been successfully concluded, the at least one image can be transferred to the neural network, which is implemented in the image evaluation unit as part of the control unit 15. In step 160, a determination is made by means of the neural network using an analysis of the at least one image as to whether or not the light sheet plane is at least partially located in the focal plane of the detection objective 12. In the simplest case, an individual image is enough herefor. Yet in particular in the case of neural networks that have been pre-trained, whether on the side of the manufacturer or by a multiplicity of already examined specimens, this individual image can already suffice to determine in which direction and/or at what distance, measured along the optical axis 17 of the detection objective 12, the light sheet plane is located from the focal plane of the detection objective 12. Here, the neural network can be selected in advance specifically with respect to the specimen and/or illumination from a plurality of available neural networks. For the image analysis, in particular convolutional neural networks (CNN) are suitable. Suitable for the illumination with structured light sheets are CNNs in which only one-dimensional convolutions takes place in order to reduce the dependence on the respective specimen.

In step 170, the result of the analysis is assessed by the neural network. If the location of the light sheet plane in relation to the focal plane of the detection objective 12 was determined with sufficient accuracy or confidence, this is either output in step 180 by informing a user in which direction the light sheet plane should be adjusted and by what amount, or advantageously the light sheet plane is brought into correspondence with the focal plane of the detection objective 12 in a region of an object field of the detection objective 12. In particular in the cases in which the light sheet 18 is tilted with respect to the focal plane of the detection objective 12, it may make sense to divide the at least one image into partial regions, wherein in this case each of the partial regions is analyzed separately by the neural network, i.e. a determination is made for each partial region separately as to in which direction and/or at what distance, measured along the optical axis of the detection objective 12, the light sheet plane is located from the focal plane of the detection objective 12. If a special partial region is selected, the light sheet plane can be brought into correspondence with the focal plane of the detection objective 12 for this partial region. For this purpose, the light sheet 18 can then be accordingly positioned in the focal plane of the detection objective 12 with the aid of the galvanometric scanner in a pupil plane of the illumination objective 10. Alternatively, the focus of the detection objective 12 itself can also be shifted, for example by means of the piezo drive 13.

However, if the analysis using the neural network reveals that it is not yet able to be determined on the basis of the at least one image in which direction and/or at what distance the focal plane of the detection objective 12 is located from the light sheet plane, adaptations are carried out in step 175, and once again at least one image is recorded and analyzed. In the case of the recording of an individual image, on the basis of which the direction into which the light sheet plane would need to be shifted can be determined, these adaptations could involve shifting the location of the light sheet 18 in said direction. In this way, the search region can be iteratively narrowed and the correct location at which the light sheet plane is in correspondence with the focal plane of the detection objective 12 can be determined. It is also possible to effect recordings successively at different distances of the light sheet plane from the focal plane of the detection objective 12, wherein the distances between the adjacent light sheet planes are in each case fixed. These recordings are then analyzed individually by the neural network, and for each recording for example the focus quality is determined, for example by using the confidence calculated by the neural network. In the distance interval having the two highest confidences, the search is subsequently refined by once again successively taking recordings of the specimen 1 at fixed distances between adjacent light sheet planes for this interval, but at a finer distance spacing. In this way it is also possible to iteratively determine the exact distance of the light sheet plane from the focal plane of the detection objective 12 and to subsequently bring the light sheet plane into correspondence with the focal plane of the detection objective 12 in a region of the object field of said objective.

Alternatively, it is also possible to transfer to the neural network for the purpose of analysis a spatial overall image generated as described above or a Z-stack of images. The Z-stack or the two-dimensional overall image composed of images that have been recorded spatially with respect to one another spaced along the optical axis 17 of the detection objective 12 are then analyzed as a whole. A fully convolutional neural network (FCN) is suitable for the analysis in particular when using an overall image, since it is possible in that case to operate with variable spatial distances of the light sheet plane between the recordings and variable numbers of recordings. For example, it is possible in the region of the extreme positions for setting the light sheet plane with respect to the optical axis 17 of the detection objective 12 to select greater distances along the optical axis 17 and smaller distances in the region of the expected or likely position of the focal plane of the detection objective 12.

Figures 4, 5:
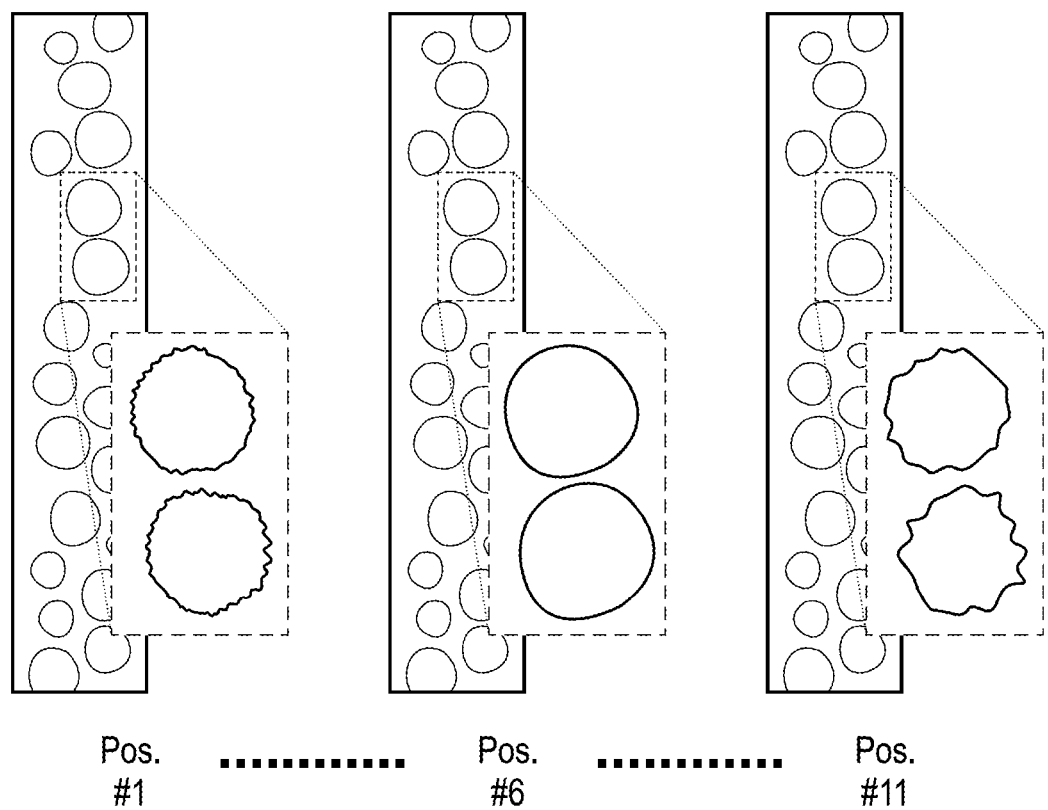
FIG. 4 shows images at different distances of the light sheet from the focal plane of the detection objective.
FIG. 5 shows the result of the analysis of the images by way of a neural network.

The use of a sequence of images in particular allows the derivation of the correct location of the light sheet plane in the focal plane of the detection objective 12 by means of polynomial or ordinal regression. Here, the images do not need to be combined into a Z-stack. This will be explained below on the basis of FIG. 4 and FIG. 5. FIG. 4 shows three recordings from a sequence of 11 images in total, which have been recorded at different locations of the light sheet plane and of the focal plane of the detection objective 12 in relation to one another. In order to adjust the location of the light sheet plane in relation to the focal plane of the detection objective 12, either the position of the light sheet can be adjusted along the optical axis 17 of the detection objective 12 by means of the galvanometric scanner or the location of the focal plane of the detection objective 12 can be varied. The distances between the light sheet plane and the focal plane between the individual recordings here in each case differ by a constant amount, i.e. they are equidistant here, but could easily be selected to be variable.

For each of the three images, one detail of the specimen is illustrated with two cells being enlarged. These have frayed peripheries at position 1 and position 11, which indicates a lack of sharpness in the respective recording. In the case of the image recorded at position 6, by contrast, the peripheries of the cells are relatively sharply contoured, which indicates a better sharpness. In the present example, based on the focus quality, for each image what is known as a score is then calculated, which is the higher, the smaller the distance is between the light sheet plane and the focal plane of the detection objective 12 in the selected region. This score is output as a score vector, and each position corresponds to one element of the vector. FIG. 5 shows this score vector for each examined position. If an ordinal regression is applied to the score vector for determining the location at which, for this specimen region, the light sheet plane lies in the focal plane of the detection objective 12, the highest score is obtained for this location at position 6. When using a polynomial, for example quadratic, regression, a value between position 6 and position 7 is obtained. Starting from the currently set position between the light sheet plane and the focal plane in the selected region, it is possible to indicate to a user in which direction the relative position change should take place, either by adjusting the light sheet location or by adjusting the focus location of the detection objective 12; advantageously, the correct location at which the light sheet plane corresponds to the focal plane of the detection objective 12 is set automatically. Subsequently, the actual light sheet microscopic examination of the specimen 1 can be performed.

The method described above offers one option for bringing, for a multiplicity of specimens, and with sufficient training even for unknown specimens, the light sheet plane and the focal plane of the detection objective 12 into correspondence in a reproducible manner, that is to say to make them substantially congruent. The error susceptibility of light sheet microscopic examinations is reduced in this way, and the results of the examination can be better compared.

LIST OF REFERENCE SIGNS

1 Specimen
2 Specimen chamber
3 Liquid
4 Specimen stage
5 Transparent bottom
6 Virtual relay
7 Laser module
8 Beam-shaping module
9 Scanning module
10 Illumination objective
11 Positioning unit
12 Detection objective
13 Piezo-drive
14 Detection module
15 Control unit
16 Optical axis of the illumination objective 17 Optical axis of the detection objective
18 Light sheet

The invention claimed is:

1. A method for light sheet microscopic examination of a specimen, comprising:
illuminating the specimen with a light sheet in a light sheet plane via an illumination objective;
imaging light emitted by the specimen onto an area-type detector via a detection objective, wherein an optical axis of the detection objective encloses with an optical axis of the illumination objective an angle that differs from 0° and from 180° and intersects the light sheet plane;
recording at least one image with the area-type detector;
analyzing the at least one image using a neural network to determine:
  i. whether or not the light sheet plane is located at least partially in a focal plane of the detection objective, and/or
  ii. in which direction along the optical axis of the detection objective the light sheet plane is located from the focal plane, and/or
  iii. at what distance, measured along the optical axis of the detection objective, the light sheet plane is located from the focal plane.

2. The method according to claim 1, further wherein recording at least one image comprises recording a sequence of images either at a constant location of a focus of the detection objective and at different positions of the light sheet along the optical axis of the illumination objective or at different positions of the light sheet relative to the focal plane of the detection objective along the optical axis of the detection objective, transferring the sequence of images to the neural network for analysis and analyzing the sequence of images using the neural network.

3. The method according to claim 2, further comprising combining the sequence of images to form an overall image before the analysis using the neural network when the sequence of images is recorded at different positions of the light sheet along the optical axis of the illumination objective, and to form a spatial image stack or an overall image when the sequence of images is recorded at different positions along the optical axis of the detection objective.

4. The method according to claim 3, wherein the sequence of images is combined to form a spatial image stack and the neural network limits its analysis to only a part of the images of the spatial image stack.

5. The method according to claim 1, further comprising determining a focus quality in order to determine the distance of the light sheet plane from the focal plane of the detection objective for the at least one image.

6. The method according to claim 1, recording at least on image comprises recording a sequence of images at different positions of the light sheet in relation to the focal plane of the detection objective along the optical axis of the detection objective, and the method further comprises:
combining the sequence of images to form an overall image and transferring the overall image to the neural network for analysis;
determining a focus quality and calculating a score via the neural network for each image in the overall image in order to determine the distance of the light sheet plane from the focal plane of the detection objective; and
determining a position for the light sheet at which it corresponds to the focal plane of the detection objective in a region of an object field of the detection objective is determined on the basis of the score.

7. The method according to claim 1, further comprising determining whether or not the light sheet plane is located at least partially in a focal plane of the detection objective, and iteratively determining a position for the light sheet plane at which it corresponds to the focal plane of the detection objective in a region of an object field of the detection objective.

8. The method according to claim 7, further comprising:
a) recording a first sequence of images at different positions of the light sheet in relation to the focal plane of the detection objective along the optical axis of the detection objective;
b) determining the focus quality for each of the images using the neural network;
c) determining, via the neural network, the two images of the first sequence between which the focus quality is best;
d) recording, between the positions along the optical axis assigned to the two images of the first sequence, a further sequence of images at different positions of the light sheet in relation to the focal plane of the detection objective along the optical axis of the detection objective; and
e) repeating steps b) to d) until the distance between the two images between which the focused quality is best falls under a specified value and/or the focus quality of these two images exceeds a specified value.

9. The method according to claim 1, wherein, for the at least one image, the distance of the light sheet plane from the focal plane is determined by regression via the neural network.

10. The method according to claim 1, further comprising, after a determination of that position at which the light sheet plane is located at least partially in the focal plane of the detection objective, brining the light sheet plane into correspondence with the focal plane of the detection objective in a region of the object field of the detection objective.

11. The method according to claim 1, further comprising dividing the at least one image into partial regions and separately determining for each partial region via the neural network as to in which direction and/or at what distance, measured parallel to the optical axis of the detection objective, the light sheet plane is located from the focal plane of the detection objective, and, when a partial region is selected and the distance has been determined, bringing the light sheet plane into correspondence with the focal plane of the detection objective in a region of an object field of the detection objective for this partial region.

12. The method according to claim 1, further comprising determining a type of the specimen before the at least one image is recorded, specifying parameters for the light sheet in dependence on the type of the specimen, and selecting the neural network.

13. The method according to claim 1, wherein the neural network used is a deep neural network (DNN).

14. The method of claim 13, wherein the DNN is a convolutional neural network (CNN).

15. The method according to claim 13, wherein the illumination takes place with a periodically structured light sheet and a convolutional neural network that is limited to a one-dimensional or two-dimensional convolution is used and/or a receptive field of the convolutional neural network is limited to a period of the light sheet.

16. The method according to claim 1, further comprising, before the analysis of the at least one image using the neural network, pre-analyzing the at least one image is as to whether the specimen is located in the image and, when this is the case, whether the specimen is suitable for the stated determination.

17. The method according to claim 16, further comprising dividing the at least one image into partial regions for the pre-analysis which are pre-analyzed individually and/or preanalyzing the at least one image via the neural network.

18. The method according to claim 1, further comprising preparing the at least one image before the analysis or before a pre-analysis via image processing algorithms.

19. A light sheet microscope for carrying out the method according to claim 1, comprising:
   an illumination device for generating the light sheet, with an illumination objective for illuminating the specimen with the light sheet in the light sheet plane,
   a detection device with the detection objective for imaging light emitted by the specimen onto the area-type detector, wherein an optical axis of the detection objective encloses with an optical axis of the illumination objective an angle that differs from 0° and from 180° and intersects the light sheet plane,
   an image evaluation unit, which is connected to the area-type detector, for evaluating the at least one image that is recorded by the area-type detector, wherein:
   a neural network is implemented in the image evaluation unit which determines during the evaluation:
      i. whether or not the light sheet plane is located at least partially in the focal plane of the detection objective, and/or
      ii. in which direction along the optical axis of the detection objective the light sheet plane is located from the focal plane, and/or
      iii. at what distance, measured along the optical axis of the detection objective, the light sheet plane is located from the focal plane.

20. The light sheet microscope according to claim 19, further comprising a controller for automatically adjusting the location of the light sheet and/or of the focal plane of the detection objective in dependence on the evaluation using the neural network, with a result that the light sheet plane is brought into correspondence with the focal plane of the detection objective in the region of the object field of the detection objective.

* * * * *